June 28, 1938. C. D. HIMEBAUGH 2,121,965
LAWN MOWER SHARPENER
Filed May 6, 1935
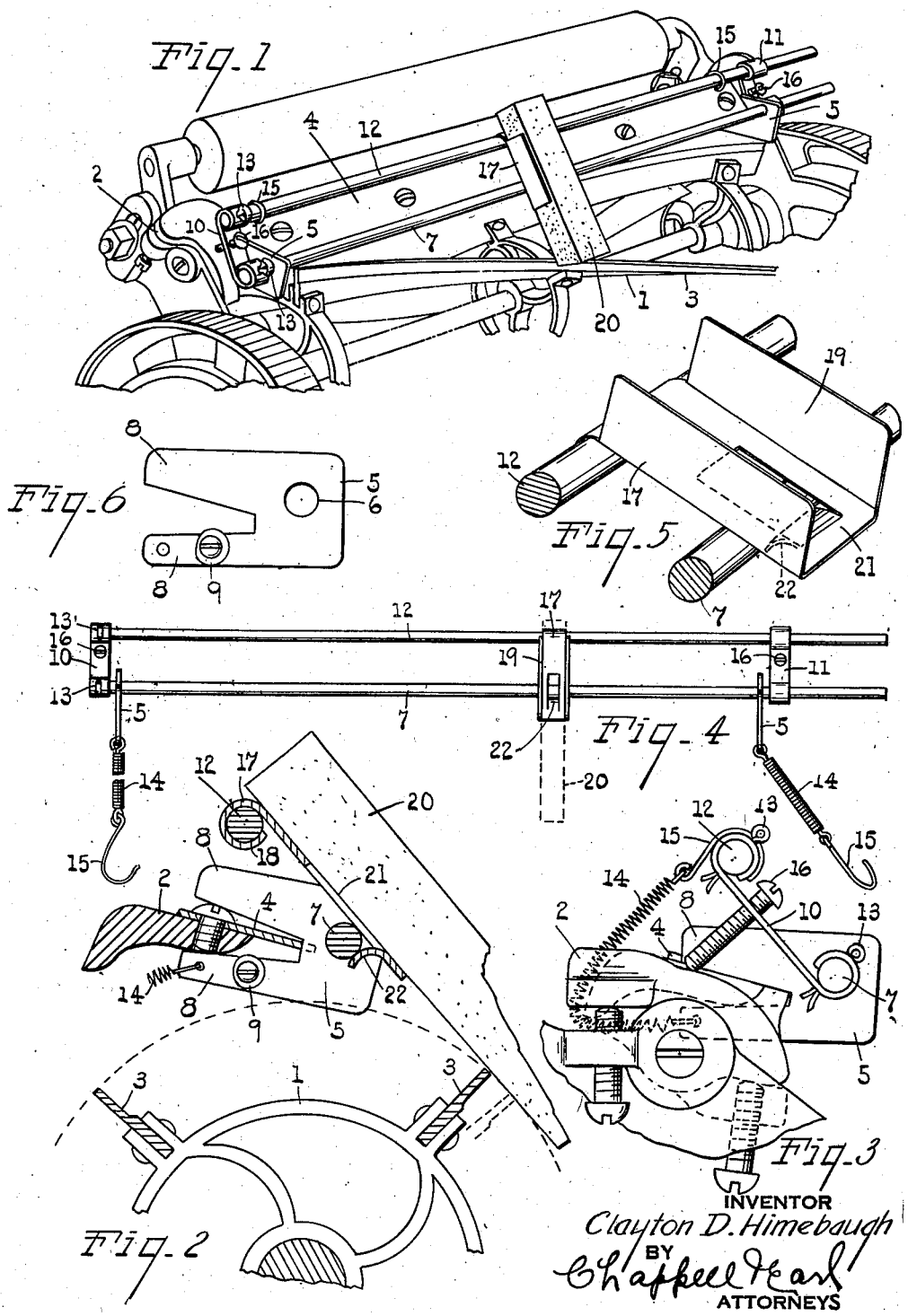
INVENTOR
Clayton D. Himebaugh
BY
Chappell Earl
ATTORNEYS Patented June 28, 1938

2,121,965

UNITED STATES PATENT OFFICE 2,121,965

LAWN MOWER SHARPENER

Clayton D. Himebaugh, Burr Oak, Mich.

Application May 6, 1935, Serial No. 19,999

14 Claims. (Cl. 51—246)

The main objects of this invention are:

First, to provide a sharpening device which is especially well adapted for effectively sharpening the revolving knives of conventional lawn mowers without removing them from the machine.

Second, to provide a sharpening device of the foregoing character which is simple and economical in its parts, easy to manipulate and very efficient and effective in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary perspective view of a lawn mower in inverted position with my sharpening device associated therewith.

Fig. 2 is an enlarged fragmentary view mainly in cross section and showing the sharpening device in operation.

Fig. 3 is a fragmentary view of the sharpener assembly in end elevation.

Fig. 4 is a fragmentary top plan view of my sharpening device.

Fig. 5 is an enlarged fragmentary view in perspective showing the relation between the rods and the hone carriage.

Fig. 6 is a view in side elevation of one of the jaw members.

Referring to the drawing, 1 in general is a conventional lawn mower in inverted position, preferably standing on its handle, the lawn mower comprising the usual cutter bar 2 and rotary knives 3, the latter being adapted to coact with a stationary shear bar or blade 4 on the cutter bar 2. Lawn mowers of this type are well known and therefore require no further description here.

In the illustrated embodiment of my invention, the sharpening device comprises a pair of jaw members 5 having alined holes 6 through which is disposed a relatively fixed slide rod 7. On the corresponding jaws 8 of the jaw members, I provide adjustable cams 9 for changing the effective opening between the jaws thereof, the jaw members being thus adapted to engage cutter bars of various widths near the ends thereof.

A pair of link-like brackets or end members 10 and 11 are associated with the rod 7 to hold a second slide rod 12 in spaced parallel relation to the rod 7, the member 10 being fixed to the rods and the member 11 being slidable longitudinally of the rods to render the device adaptable to lawn mowers of various widths. The member 10 is preferably held in place by means of cotter pins 13 extending through holes in the member and rods.

The jaw members 5 are held in place on the cutter bar 2 by means of coiled tension springs 14 connected to the corresponding jaws 8 of the jaw members, the outer ends of the springs being provided with hooks 15 for engaging the rod 12 with the springs resiliently embracing the cutter bar near the ends thereof. For adjusting the angle of the members 10 and 11 relative to the cutter bar and about the first rod 7 as an axis, I provide screws 16 threaded to the end members, the inner ends of the screws abutting the cutter bar 2 as best shown by Fig. 3. The springs 14 expand and contract to permit the angle to be changed without affecting the relatively fixed position of the rod 7 with respect to the cutter bar 2. This adjustment is desirable to take care of various differences in the diameter of the rotors of lawn mowers now on the market.

A hone carriage 17 is pivoted to the rod 12 at 18 and is adapted to slidably rest on the rod 7 for sliding movement longitudinally of both rods. The carriage has a channel-like seat 19 extending transversely of the rods for receiving a hone 20 preferably of carborundum, the hone projecting from the channel for sharpening the rotary knives 3 as the carriage is moved forward and backward and the rotary knives are revolved.

The hone carriage 19 is preferably made of sheet metal, the web 21 of the channel being provided with a downturned piece 22 engaging the rod 7. The sides of the channel releasably engage the hone 20 so that the hone may be readily assembled with and adjusted relative to the carriage.

The lawn mower 1 to be sharpened is preferably first inverted as shown by Fig. 1 or stood on its handle and inclined relative to a wall. The sharpening device is then assembled with the cutter bar 2 as pointed out above in connection with the elements of the device. After the various adjustments have been made, the rotary knives 3 are revolved in a direction opposite to their normal movement and the carriage 17 at the same time is moved slowly back and forth on the rods 7 and 12. This action quickly sharpens the rotary blades 3, after which the sharpening device is readily removed from the lawn mower by simply releasing the hooks 15 from the rod 12.

From the foregoing description of my invention, it will be apparent to those skilled in the art that I provide a lawn mower sharpening device which is simple and economical in its parts and very efficient and effective for the purpose intended. The device is adjustable to take care of conventional lawn mowers of various sizes although being very simple and economical in its parts. The longitudinal movement of the hone coupled with the transverse movement due to the revolving of the rotary knives greatly facilitates the sharpening action of the device and leaves a highly desirable cutting edge on each rotary knife for coaction with the stationary blade or knife in the normal use of the mower.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent, is:

1. A sharpening device for lawn mowers having rotary knives and a cutter bar, comprising a pair of jaw supporting members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, one of said end members being fixed and the other slidable longitudinally relative to said rods, coiled tension springs connected to corresponding jaws of said jaw members, hooks on the outer ends of said springs for engaging said second rod with the springs embracing the cutter bar, screws threaded to said end members for adjusting the angle of the end members relative to the cutter bar and about said first rod as an axis, a hone carriage pivoted to said second rod and resting on said first rod for sliding movement longitudinally of both ends, the carriage having a channel-like hone seat extending transversely of said rods, and a hone removably fitting said seat and projecting therefrom for sharpening the rotary knives as the carriage is moved back and forth and the rotary knives are revolved.

2. A sharpening device for lawn mowers having rotary knives and a cutter bar, comprising a pair of jaw supporting members adapted to engage the cutter bar near the ends thereof and having alined holes, means operatively associated with said jaw members for changing the effective opening between the jaws thereof, a first rod disposed through said holes, a pair of end members on said first rod, a second rod held by said end members in spaced parallel relation to said first rod, coiled tension springs connected to corresponding jaws of said jaw members, hooks on the outer ends of said springs for engaging said second rod with the springs embracing the cutter bar, means operatively associated with said end members for adjusting the angle of the end members relative to the cutter bar and about said first rod as an axis, a hone carriage pivoted to said second rod and resting on said first rod for sliding movement longitudinally of both ends, and a hone removably fitting said carriage and projecting therefrom for sharpening the rotary knives as the carriage is moved back and forth and the rotary knives are revolved.

3. A sharpening device for lawn mowers having rotary knives and a cutter bar, comprising a pair of supporting jaw members adapted to engage the cutter bar near the ends thereof and having alined holes, a first rod disposed through said holes, a pair of end members on said first rod, a second rod held by said end members in spaced parallel relation to said first rod, coiled tension springs connected to corresponding jaws of said jaw members, hooks on the outer ends of said springs for engaging said second rod with the springs embracing the cutter bar, screws threaded to said end member for adjusting the angle of the end members relative to the cutter bar and about said first rod as an axis, a hone carriage pivoted to said second rod and resting on said first rod for sliding movement longitudinally of both rods, the carriage having a seat extending transversely of said rods, and a hone fitting said seat and projecting therefrom for sharpening the rotary knives as the carriage is moved back and forth and the rotary knives are revolved.

4. A sharpening device for lawn mowers having rotary knives and a cutter bar, comprising a pair of supporting jaw members adapted to engage the cutter bar near the ends thereof and having alined holes, a first rod disposed through said holes, a pair of end members on said first rod, a second rod held by said end members in spaced parallel relation to said first rod, springs connected to corresponding jaws of said jaw members, hooks on the outer ends of said springs for engaging said second rod with the springs embracing the cutter bar, screws threaded to said end members for adjusting the angle of the end members relative to the cutter bar and about said first rod as an axis, and a hone carriage pivoted to said second rod and resting on said first rod for sliding movement longitudinally of both rods.

5. A sharpening device for lawn mowers having rotary knives and a cutter bar, comprising a pair of supporting jaw members adapted to engage the cutter bar near the ends thereof and having alined holes, a first rod disposed through said holes, a pair of end members on said first rod, a second rod held by said end members in spaced parallel relation to said first rod, springs connected to corresponding jaws of said jaw members, hooks on the outer ends of said springs for engaging said second rod with the springs embracing the cutter bar, means for adjusting the angle of the end members relative to the cutter bar and about said first rod as an axis, and a hone carriage pivoted to said second rod and resting on said first rod for sliding movement longitudinally of both rods.

6. A sharpening device for lawn mowers having rotary knives and a cutter bar, comprising a pair of supporting jaw members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, one of said end members being fixed and the other slidable longitudinally relative to said rods, coiled tension springs connected to corresponding jaws of said jaw members, hooks on the outer ends of said springs for engaging said second rod with the springs embracing the cutter bar, means threaded to said end member for adjusting the angle of the end members relative to the cutter bar and about said first rod as an axis, a hone carriage mounted for sliding movement longitudinally of both rods, the carriage having a seat extending transversely of said rods, and a hone fitting said seat and projecting therefrom for sharpening the rotary knives as the carriage is moved back and forth and the rotary knives are revolved.

7. A sharpening device for lawn mowers having rotary knives and a cutter bar, comprising a pair of supporting jaw members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, one of said end members being fixed and the other slidable longitudinally relative to said rods, coiled tension springs connected to corresponding jaws of said jaw members, hooks on the outer ends of said springs for engaging said second rod with the springs embracing the cutter bar, a hone carriage mounted for sliding movement longitudinally of both rods, the carriage having a seat extending transversely of said rods, and a hone fitting said seat and projecting therefrom for sharpening the rotary knives as the carriage is moved back and forth and the rotary knives are revolved.

8. A sharpening device for lawn mowers having rotary knives and a cutter bar, comprising a pair of supporting jaw members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, coiled tension springs connected to corresponding jaws of said jaw members, hooks on the outer ends of said springs for engaging said second rod with the springs embracing the cutter bar, a hone carriage mounted for sliding movement longitudinally of both rods, the carriage having a seat extending transversely of said rods, and a hone fitting said seat and projecting therefrom for sharpening the rotary knives as the carriage is moved back and forth and the rotary knives are revolved.

9. A sharpening device for lawn mowers having rotary knives and a cutter bar, comprising a pair of supporting members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, springs connected to corresponding jaws of said jaw members and having means for engaging said second rod with the springs embracing the cutter bar, a hone carriage mounted for sliding movement longitudinally of both rods, the carriage having a seat extending transversely of said rods, and a hone fitting said seat and projecting therefrom for sharpening the rotary knives as the carriage is moved back and forth and the rotary knives are revolved.

10. A sharpening device for lawn mowers having rotary knives and a cutter bar, comprising a pair of supporting jaw members adapted to engage the cutter bar near the ends thereof and having alined holes, adjustable cams on corresponding jaws of said jaw members for changing the effective opening between the jaws thereof, a first rod disposed through said holes, a pair of end members on said first rod, a second rod held by said end members in spaced parallel relation to said first rod, springs connected to corresponding jaws of said jaw members and having means for engaging said second rod with the springs embracing the cutter bar, and a hone carriage mounted for sliding movement longitudinally of both rods.

11. A sharpening device for lawn mowers having rotary knives and a cutter bar, comprising a pair of supporting jaw members adapted to engage the cutter bar near the ends thereof and having alined holes, a first rod disposed through said holes, a pair of end members on said first rod, a second rod held by said end members in spaced parallel relation to said first rod, springs connected to corresponding jaws of said jaw members and having means for engaging said second rod with the springs embracing the cutter bar, and a hone carriage mounted for sliding movement longitudinally of both rods.

12. A sharpening device for lawn mowers comprising supporting members provided with V-jaws adapted to engage a cutter bar, a slide rod on said supporting members projecting through the same, a second slide rod, link-like supporting brackets for said second rod mounted on the projecting ends of said first slide rod, a hone carriage slidable on said rods, adjusting screws for said brackets, and spring tie members connected to said supporting members and adapted to be disposed around the cutter bar and provided with hooks detachably engageable with the second slide rod.

13. A sharpening device for lawn mowers comprising supporting members adapted to engage a cutter bar, a slide rod on said supporting members, a second slide rod, supporting brackets for said second rod mounted on the said first slide rod, a hone carriage slidable on said rods, and adjusting screws for said brackets.

14. A sharpening device for lawn mowers comprising supporting members provided with V-jaws adapted to engage a cutter bar, a slide rod on said supporting members projecting through the same, a second slide rod, link-like supporting brackets for said second rod mounted on the projecting ends of said first slide rod, a hone carriage slidable on said rods, and spring tie members connected to said supporting members and adapted to be disposed around the cutter bar and provided with hooks detachably engageable with the second slide rod.

CLAYTON D. HIMEBAUGH.